United States Patent Office 2,845,330
Patented July 29, 1958

2,845,330

METHOD OF RECOVERING CYANIDES FROM WASTE AQUEOUS SOLUTIONS CONTAINING METAL CYANIDES

Walter Zabban, Pittsburgh, Pa., assignor to Artemas F. Holden, Detroit, Mich.

No Drawing. Application August 15, 1955
Serial No. 528,539

15 Claims. (Cl. 23—79)

This invention relates to the recovery of cyanides from industrial wastes.

Metal cyanides are used in various manufacturing operations. Such cyanides are used in solution for the electroplating of metal, and are also used, in molten form, as an ingredient of molten metallurgical salt baths. After periods of use, the solutions or baths become contaminated by the introduction of foreign materials, by chemical breakdown, or both, so as to require replacement.

Cyanide compounds are violently poisonous to all animal life, even in very small concentrations, and, therefore, cannot be readily disposed of, even though highly diluted. Most metal cyanides, as they exist in industrial wastes, are water-soluble to a substantial extent, and thus cannot safely be discharged into rivers and streams.

This application is a continuation-in-part of application S. N. 275,660, filed March 8, 1952, now abandoned.

The present invention is directed to a method of, and a compound for, recovering the cyanide content of industrial wastes such as sodium and potassium cyanide solutions, copper, brass, bronze, zinc, and silver-plating solutions, the recovered cyanide being in such a form that it may readily be reused, the recovery being so complete when preferred embodiments of the method of the invention are used that the waste solution remaining contains not more than 0.5 p. p. m of cyanide (as CN) and a very small content, on the order of 2 p. p. m., of metallic ions left in solution. Thus, the remaining solution, after use of the preferred method, requires very little or no dilution before it may safely be discharged into public waterways.

The cyanide-containing industrial waste, if in the form of an exhausted electroplating solution, may immediately be treated to recover metallic cyanide therefrom. If the cyanide-containing waste is in the form of a solid salt from a used metallurgical salt bath, the waste is dissolved in water prior to treatment. Usually, the cyanide-containing portion of the waste goes into solution before most of the other constituents are dissolved. The undissolved solids are removed before the solution is treated to precipitate metallic cyanides in accordance with the invention.

The metallic cyanides are precipitated from the waste cyanide solution by adding thereto a mixture of copper sulfate and sodium sulfite (or equivalent in sulfur dioxide), the sodium sulfite added being sufficient to completely reduce the copper sulfate to cuprous sulfate, the copper sulfate being just sufficient to produce sufficient cuprous sulfate to completely react with the cyanide content of the waste cyanide solution to form an insoluble metallic cyanide or a mixture of insoluble metallic cyanides. The insoluble reaction product may then be separated from the remaining waste solution.

In a preferred procedure, applicable to waste cyanide solutions of any cyanide concentration, during at least the greater part of the period of addition of the reagents to the waste solution, and preferably during the entire period of such addition, the solution is maintained markedly basic to prevent the evolution of HCN. With solutions containing less than about 1,000 p. p. m. of cyanide (CN), the solution may be maintained less basic than when treating solutions containing over about 1,000 p. p. m. of cyanide, since, with solutions containing 1,000 p. p. m. of cyanide or less, the reaction producing the insoluble metallic cyanide to be recovered proceeds so rapidly that very little, if any, hydrogen cyanide escapes. After all, or substantially all, of the reagents have been added, the pH value of the solution is adjusted to bring it into the range of slightly alkaline to slightly acid to produce an almost complete precipitation of the resulting insoluble reaction product.

When the cyanide is originally present in the waste solution primarily as a cuprous salt, the insoluble product of the above reaction is predominantly cuprous cyanide. When the cyanide of metals such as zinc is present along with that of copper in the original waste solution, the insoluble product of the above reaction is either a true double salt of such metals or a mixture of two metallic salts, in which case the insoluble product is a mixture of $Cu_2(CN)_2$ and $M_n(CN)_z$, where M represents the metal other than copper.

When the waste solution contains the cyanide predominantly as copper cyanide, treatment of such solution by the present method results in a supernatant liquid containing less than 0.5 p. p. m. of cyanide (CN), or less than about 2 p. p. m. of cuprous cyanide. When the original waste solution contains the cyanides in the form of copper and zinc cyanides, treatment of the waste solution by the method of the invention produces a supernatant liquid containing less than 0.5 p. p. m. of cyanide (CN), or a total of no greater than 2 p. p. m. of cuprous and zinc cyanides.

Where, with waste solutions containing cyanides of metals other than copper and zinc, and wherein the reaction product resulting from treatment of the solution according to the present invention is somewhat more soluble in the supernatant liquid than the cyanides of copper and zinc, the method of the present invention is of value in that it markedly reduces the cyanide content of the supernatant liquid below the cyanide content of the original waste solution. In such cases, where the cyanide content of the supernatant liquid might be higher than the value acceptable for discharge to streams, it may be acceptable for immediate discharge to sewers connected to sewage-disposal plants, or it may be further treated to render it acceptable for such discharge. In such further treatment, if one is necessary, the supernatant liquid can be treated with either chlorine or a hypochlorite reagent, the requirements of these chemicals being considerably less than they would have been except for treatment of the waste solution in accordance with the invention.

An object of the present invention is to provide an improved process of, and material for, the recovery of cyanide from cyanide wastes.

A further object of the invention is to provide an improved process of, and material for, the recovery of cyanide primarily as cuprous cyanide from copper-containing waste cyanide solutions.

Another object of the invention is to provide a process that will readily and economically remove substantially all of the cyanide and metal contact from waste cyanide solutions wherein the reaction product produced by the present invention is substantially insoluble, so as to permit disposal of the remaining waste material without the necessity of taking special precautions.

The cyanide-containing industrial wastes which the process of the present invention is adapted to handle are either initially in, or are made to be, aqueous solutions of metal cyanides, together with other salts and various contaminants including oils, oxide scale, and other chemicals. The process advantageously is applied to wastes containing at least some copper cyanide, since it is then unnecessary to add as much copper sulfate as would otherwise be required. Examples of such wastes are contaminated brass and bronze electroplating solutions containing copper cyanide, zinc cyanide, and sodium cyanide, and copper cyanide plating solutions containing copper cyanide, sodium cyanide, and sodium carbonate, both with and without Rochelle salt.

As pointed out above, the process of the present invention may also be applied to the recovery of metallic cyanide wastes generally, the cyanides usually being water-soluble in a high degree so as to be dissolved out of the wastes, leaving the less soluble constituents to be disposed of separately. Typical of such other cyanide wastes are the molten salt metal-treating baths mentioned above. The thus formed aqueous cyanide solution may then be treated as described below.

According to the present invention, sufficient copper sulfate ($CuSO_4$), together with sodium sulfite ($Na_2SO_3$), is added to the aqueous waste-cyanide solution to cause at first a reduction of the copper ion from the cupric to the cuprous state, and to provide just enough copper ions to react with the entire cyanide content and form, when the waste solution contains cyanides predominantly in the form of copper cyanide, cuprous cyanide $$[Cu_2(CN)_2]$$

and, where the original waste solution contains cyanide of two or more metals, one such metal usually being copper, a substantially insoluble reaction product, which may be either a true double cyanide salt of such metals or a mixture of two metallic cyanide salts.

In a preferred procedure, applicable to the treatment of cyanide-containing waste solutions containing any concentration of cyanide, the solution is maintained markedly basic during all, or substantially all, of the period of addition of the reagents to the waste solution. The higher the concentration of initial free cyanide, the higher the pH value of the solution necessary during the initial treatment period to prevent the evolution of hydrogen cyanide. Such preferred initial treatment of the waste solution may be modified, as indicated below, in the treatment of waste solutions having cyanide contents of about 1,000 p. p. m. or below. After the reagents for recovery of the cyanide content have been completely added, the pH of the solution is then reduced, if necessary, as in the preferred method, to the range of slightly alkaline to slightly acid (6.5–7.5) by the addition of an acid reagent which may be sodium bisulfate, sulfuric acid, hydrochloric acid, or other suitable acids. It is preferred not to use nitric acid, since this appears to have a tendency to decompose the metallic cyanide precipitate. The subsequent adjustment of the pH value to the range indicated produces an environment in which the dissociation of such metallic cyanide precipitate is very small and in which the floc produced settles very rapidly. The resulting precipitate is also easy to filter.

The described reaction is preferably conducted at room temperature (60–90° F.), which appears to be optimum insofar as attaining a reasonable speed of reaction and the prevention of undue evolution of HCN are concerned. The chemical reaction taking place appears to be a reaction of the cuprous ion from the added copper sulfate with the cyanide ion already present in the solution to form insoluble metal cyanides, principally cuprous cyanide, which precipitate readily under the described conditions to leave a solution having a cyanide (CN) content of about 0.5 p. p. m. Under preferred conditions of operation, the waste liquid resulting from treatment of copper-containing cyanide wastes, such as copper or bronze electroplating solutions, will have a copper content of not greater than 2 p. p. m. The ratio of reagents required is 1 mole of copper sulfate and ½ mole of sodium sulfite per mole of CN. However, in the recovery of cyanides from certain wastes already containing some available copper, the amount of copper sulfate required decreases in a stoichiometric proportion.

The process of the present invention will be more fully illustrated by the following three examples of the treatment of waste solutions containing different concentrations of cyanide.

EXAMPLE 1

*Waste solution containing more than about 1,000 p. p. m. cyanide*

Copper sulfate and sodium sulfite, designated "the reagents," are added to the waste solution in stoichiometric amounts as regards the cyanide content, having regard for the initial free copper ion content of the solution. Sodium hydroxide (NaOH) is added to the solution when necessary, both initially and during the addition of reagents to maintain the pH of the solution during such period at a value of 9 or above, in some cases it being necessary to maintain the pH value as high as 11. A higher initial pH not only prevents the evolution of HCN, but prevents the foaming of the solution which would be caused by carbon dioxide produced if the solution were neutral or acid and if carbonates or bicarbonates were originally present in the solution being treated.

After the reagents have been added to the solution, the pH of the solution is reduced as by the addition of sodium bisulfate ($NaHSO_4$) to reduce the pH of the solution to a range of 6.5–7.5. The floc is then allowed to settle and, after a sufficient period to allow such precipitation, the insoluble reaction product is separated from the supernatant liquid.

As above indicated, the procedure of Example 1 may be applied to cyanide-containing solutions of any cyanide concentration. Where the cyanide content is low, the above preferred procedure may be modified as illustrated in Examples 2 and 3.

EXAMPLE 2

*Cyanide waste solution having concentration from 200 p. p. m. to 1,000 p. p. m.*

With a solution having a cyanide concentration of about 200 to about 1,000 p. p. m., it is not necessary to maintain as high a pH value during the period of addition of the reagents as that given in Example 1. Frequently, in the procedure of this example, the pH value of the waste solution being treated may drop below 9, and in some cases as low as 8, without causing an undue evolution of HCN.

Copper sulfate and sodium sulfite are added in stoichiometric amounts, as in Example 1. As indicated, the pH value of the solution will usually fall below 9, no addition of NaOH being necessary so long as an unsafe quantity of HCN is not given off.

The pH of the solution is then adjusted to bring it into the range of 6.5–7.5 as by the addition of sodium bisulfate. The insoluble reaction product is then allowed to settle and is then separated from the supernatant liquid as in Example 1.

EXAMPLE 3

*Waste solution containing less than about 200 p. p. m. cyanide*

With dilute (under about 200 p. p. m. CN) cyanide solutions, the pH value of the solution may be lowered below 6.5 by the addition of copper sulfate and sodium sulfite. If it is, the solution is rendered more basic by the addition of NaOH to bring the pH value above 7.5.

Copper sulfate and sodium sulfite are added to the solution in stoichiometric amounts, as in Example 1. As above indicated, if the pH value of the solution falls below 6.5, sufficient NaOH is added to bring it up to above 7.5.

After the addition of the reagents is complete, the pH of the solution is adjusted to the range 6.5-7.5, the resultant insoluble floc is allowed to settle and is then separated from the liquid as in the other examples.

As indicated, the above-described process may be applied with equal facility to either dilute or concentrated aqueous solutions containing cyanides. However, it is necessary, when treating dilute solutions, to use an excess amount of sodium sulfite over that required to reduce the copper sulfate added. This additional amount of sodium sulfite is required to react with the dissolved oxygen present in the solution, which may amount to as much as 8 p. p. m. When the cyanide concentration of a solution is above about 500 p. p. m., the effect of dissolved oxygen is negligible, but with dilute solutions containing as little as 25 p. p. m. of cyanide the total requirement of sodium sulfite may be about double that required to reduce the copper sulfate, depending upon the amount of oxygen dissolved in the solution.

Each of the reagents, sodium sulfite and copper sulfate, and the sodium bisulfate may be added in dry form or in aqueous solution, taking care that each such compound is thoroughly dissolved or dispersed. It is necessary to agitate the solution while the compounds are added. The reaction progresses very rapidly, and very little frothing occurs even while treating rather concentrated (10,000 to 50,000 p. p. m. CN) cyanide solutions.

After the pH value of the solution has been reduced to the range of slightly alkaline to slightly acid (6.5-7.5), the metallic cyanide floc which forms as a result of the above reaction settles readily. After complete settling has occurred, the supernatant liquid is decanted. The slurry is washed twice with water and then allowed to settle, the supernatant liquid being decanted in each instance. The washed metallic cyanide slurry is filtered through a vacuum or positive pressure filtering unit.

As indicated, where the waste solution contains predominantly copper cyanide, the reaction product from use of the method of the invention consists predominantly of cuprous cyanide. A cuprous cyanide filter cake can be used without drying in the preparation of a copper cyanide plating bath. Otherwise, the filter cake may be dried under vacuum or the atmosphere under a curtain of nitrogen or other inert gas. The dry copper cyanide product obtained by vacuum drying the filter cake produced from a waste copper cyanide plating solution contains about 98% cuprous cyanide.

Although the above-described treatment of aqueous cyanide solutions is of the batch type, the method of the invention may be employed in the continuous treatment of such solutions. Such continuous treatment is of advantage, for example, in the removal of cyanide from rinse waters in a closed system. In such a method, the rinse water is continuously recirculated to a treatment and detention tank where the three compounds (copper sulfate, sodium sulfite, and sodium bisulfate) are added continuously either together or separately at a predetermined rate. Usually such rinse waters have a rather low (on the order of 200 p. p. m.) CN content, so that it is not imperative to maintain the pH of the solution at much, if any, above the neutral range to prevent the undue evolution of HCN. After a sufficient detention time to insure the substantially complete settling of the precipitate, the treated solution is then pumped through a pressure-tight filter back to the rinse-water tank. The rinse water may thus be recirculated until the concentration of sulfate ion builds up to such a point that it begins to interfere with the rinsing efficiency of the water. The rinse water can then be dumped into a stream without fear of contamination, since its cyanide content is on the order of 0.5 p. p. m.

For convenience, the chemicals for carrying out the above process may be mixed and packaged. For the treatment of copper-containing electroplating solutions having a high concentration of copper cyanide (at least 500 p. p. m. of CN), for example, a mixture consisting essentially of 7.45 parts of crystalline copper sulfate, 2.10 parts of sodium sulfite, and 0.45 parts (all by weight) of caustic soda or equivalent alkali is preferable. For use in more dilute copper-containing cyanide solutions (less than 100 p. p. m. of total CN), the sodium sulfite may be increased up to about 4.0 parts. For higher alkaline solutions, sodium bisulfate or other acid reagent is substituted for caustic soda.

The amount of chemical mixture required for the process, when treating waste copper plating solutions, is about 9½ pounds per pound of cyanide (as CN) recovered from concentrated waste cyanide copper and bronze plating solutions, and up to 11 pounds per pound of cyanide recovered for solutions having a concentration of about 25 p. p. m. of cyanide.

I claim:

1. The method of recovering cyanides from waste aqueous solutions containing metal cyanides, comprising adding copper sulfate and sodium sulfite, maintaining a pH of between 6.5 and 7.5 to precipitate the cyanide compounds, the precipitate consisting principally of cuprous cyanide, and then separating the precipitate from the solution.

2. The method of recovering cyanides from waste aqueous solutions containing copper cyanide, comprising adding copper sulfate and sodium sulfite, maintaining a pH of between 6.5 and 7.5 to precipitate the cyanide compounds, the precipitate consisting principally of cuprous cyanide, and then separating the precipitate from the solution.

3. The method of recovering cyanides from a waste aqueous solution containing copper cyanide, comprising adding 7.45 parts of copper sulfate, at least 2.10 parts of sodium sulfite, and about .45 parts of sodium hydroxide, maintaining a pH of from 6.5 to 7.5 in order to precipitate the cyanide content as insoluble metal cyanides, the precipitate consisting principally of cuprous cyanide, and then separating the precipitate from the solution.

4. The method of recovering cyanides from a waste aqueous solution containing copper cyanide, comprising adding about 7.45 parts of copper sulfate, 2.10 parts of sodium sulfite, and .45 parts of sodium hydroxide, maintaining a pH of from 6.5 to 7.5 in order to precipitate the cyanide content as insoluble metal cyanides, the precipitate consisting principally of cuprous cyanide, and then separating the precipitate from the solution.

5. The method of recovering cyanides from waste aqueous solutions containing at least about 1000 p. p. m. of metal cyanides, comprising adding the reagents copper sulfate and sodium sulfite to such solution while maintaining the solution at a pH of at least 9, then reducing the pH of the solution to between 6.5 and 7.5 after substantially the stoichiometrically correct amounts of such reagents have been added to form a precipitate of substantially insoluble metallic cyanides with all of the cyanide ion present, and then separating the precipitate from the solution.

6. The method of recovering cyanides from waste aqueous solutions containing at least about 1000 p. p. m. of copper cyanide, comprising adding the reagents copper sulfate and sodium sulfite to such solution while maintaining the solution at a pH of at least 9, then reducing the pH of the solution to between 6.5 and 7.5 after substantially the stoichiometrically correct amounts of such reagents have been added to form a precipitate of insoluble cyanide compounds consisting principally of cuprous cyanide with all of the cyanide ion present, and then separating the precipitate from the solution.

7. The method of recovering cyanides from waste aqueous solutions containing metal cyanides, comprising adding copper sulfate and sodium sulfite to such solution while maintaining the solution at a sufficiently high pH value that substantially no HCN is evolved, then reducing the pH of the solution to between 6.5 and 7.5 after substantially the stoichiometrically correct amounts of such reagents have been added to form a precipitate of substantially insoluble metallic cyanides with all of the cyanide ion present and then separating the precipitate from the solution.

8. The method of recovering cyanides from waste aqueous solutions containing copper cyanide, comprising adding copper sulfate and sodium sulfite while maintaining the solution at such a sufficiently high pH value that substantially no HCN is evolved, then reducing the pH of the solution to between 6.5 and 7.5 after substantially the stoichiometrically correct amounts of such reagents have been added to form a precipitate of insoluble cyanide compounds consisting principally of cuprous cyanide with all of the cyanide ion present, and then separating the precipitate from the solution.

9. The method of recovering cyanides from waste aqueous solutions containing at least 200 p. p. m. of metal cyanides, comprising adding the reagents copper sulfate and sodium sulfite to such solution while maintaining the solution at a pH of at least 8, then reducing the pH of the solution to between 6.5 and 7.5 after substantially the stoichiometrically correct amounts of such reagents have been added to form a precipitate of substantially insoluble metallic cyanides with all of the cyanide ion present, and then separating the precipitate from the solution.

10. In a method of recovering cyanide from waste aqueous solutions containing metal cyanides, the steps of adding copper sulfate and sodium sulfite to form cuprous cyanide; precipitating the cyanide compounds, consisting principally of cuprous cyanide, at a pH of from 6.5 to 7.5; and separating the precipitate from the solution.

11. In a method of recovering cyanides from waste aqueous solutions containing metal cyanides, the steps of adding copper sulfate and sodium sulfite at a pH greater than 8 and in stoichiometric amounts necessary to convert substantially the total CN content to cuprous cyanide, reducing the pH to from 6.5 to 7.5 to precipitate substantially all of the cuprous cyanide, and separating the precipitate from the solution.

12. The method of recovering cyanides from an aqueous solution containing copper cyanide, comprising adding to the solution one mole of copper sulfate and one-half mole of sodium sulfite per mole of cyanide (as CN) and at a pH of at least 8, reducing the pH to from 6.5 to 7.5 to precipitate substantially all of the cuprous cyanide, and then separating the precipitate from the solution.

13. The method of recovering cyanides from a waste aqueous solution containing metallic cyanides, comprising adding copper sulfate and sodium sulfite, with sufficient basic reagent to maintain the pH of the solution markedly basic, thereby preventing the substantial evolution of hydrogen cyanide; adding an acidic reagent to reduce the pH of the solution to substantially neutral, thereby precipitating substantially all of the cyanide content of said solution as insoluble metal cyanides; and then separating the precipitate from the solution.

14. The method of recovering cyanides from waste aqueous solutions containing metallic cyanides, comprising adding copper sulfate and sodium sulfite to the solution while maintaining the solution at a pH value of at least 8, the pH value increasing in proportion to the cyanide content thereof; reducing the pH of the solution to between 6.5 and 7.5 to form a precipitate of insoluble cyanide compounds consisting principally of cuprous cyanide; and then separating the precipitate from the solution.

15. In a method of recovering cyanide from waste aqueous solutions containing metal cyanides, the steps of adding copper sulfate and sodium sulfite at a pH value greater than 8, subsequently substantially completely precipitating the resultant cuprous cyanide at a pH value of from 6.5 to 7.5, and separating the precipitate from the solution.

References Cited in the file of this patent

UNITED STATES PATENTS 2,049,358     Dangelmajer     July 28, 1936

OTHER REFERENCES

Gmelin-Krauts: "Handbuch der Anorganischen Chemie, vol 5, part 1, pages 1012 and 1013.